April 18, 1933.     C. Z. MILLER     1,903,930
SLED
Filed Jan. 19, 1931
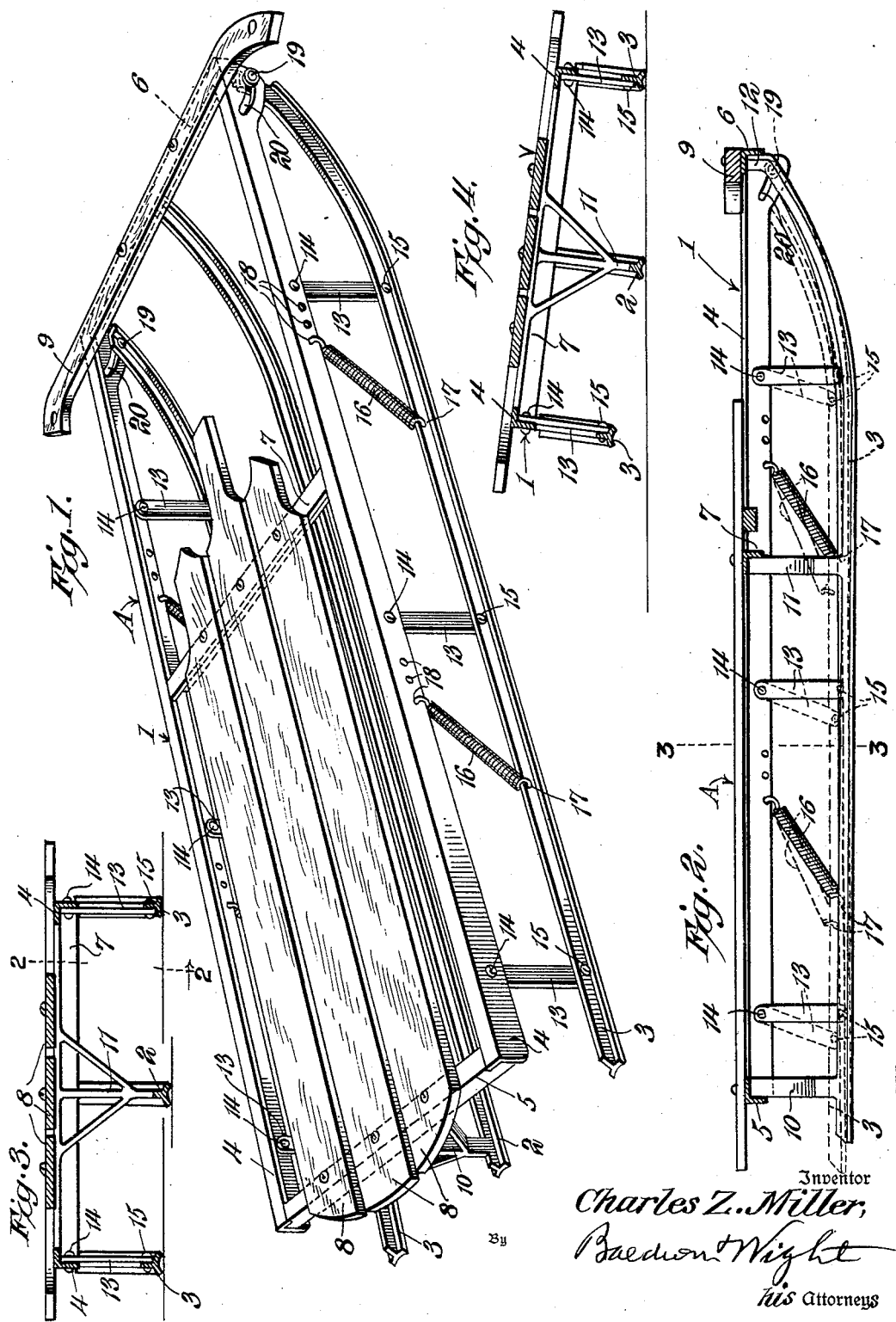
Inventor
Charles Z. Miller,
his Attorneys Patented Apr. 18, 1933

1,903,930

UNITED STATES PATENT OFFICE

CHARLES Z. MILLER, OF FORT SCOTT, KANSAS

SLED

Application filed January 19, 1931. Serial No. 509,792.

This invention relates to sleds and more particularly to sleds having runners especially adapted for facilitating steering. Heretofore various arrangements of runners have been employed for facilitating the steering of sleds, probably the best known of which is that in which the runners are arranged to be simultaneously flexed laterally at their forward ends. While this arrangement has in general served to steer the sled satisfactorily, it has been found that when sharp turns are made there is a tendency for the sled to overturn or to skid. Moreover, in order that such runners be readily flexed laterally it is necessary that they be of light construction.

An object of the present invention is to provide a sled which may be easily steered by the user's merely shifting his weight to one side or the other of the sled depending upon in which direction it is desired that the sled be directed, the arrangement being such that when steering is thus effected the sled top or seat will be inclined relatively to the ground and a banked effect thus provided which tends to decrease the danger of skidding or upsetting. More specific objects will become apparent from a reading of the following description, the appended claims and the several views of the drawing in which Figure 1 is a perspective view of a sled embodying the invention;

Figure 2 is a longitudinal vertical sectional view taken on the line 2—2 of Figure 3;

Figure 3 is a transverse vertical sectional view taken on the line 3—3 of Figure 2 and showing the runners in normal position; and Figure 4 is a view similar to Figure 3, but showing the relative positions of the runners when the sled is being steered to one side.

In the drawing which illustrates one practical embodiment of the invention, a sled generally designated A is shown as comprising a frame 1, a centrally disposed runner 2, and spaced side runners 3, 3 located on opposite sides of the central runner 2.

The sled frame includes angle section side members 4, 4, a rear transverse member 5, a front transverse member 6, and an intermediate transverse member 7, the connections between the several frame members being welded. The sled is provided with a top or seat comprising three slats 8 suitably secured to the transverse members 5 and 7, and with a hand grasp or foot rest 9 secured to the front end of the sled frame.

The centrally disposed runner 2 is rigidly connected to the frame at the rear and at an intermediate point by means of fixed struts 10 and 11 and is directly connected at its forward end, as at 12, to the front transverse frame member 6. Each side runner 3 is yieldably connected to the frame and is arranged for depressible movement toward the frame member when the user of the sled concentrates his weight at one side or the other thereof as will be hereinafter explained.

The connections between each side runner and the frame include a plurality of struts 13 each pivoted as at 14 to the frame and as at 15 to the associated side runner 3. Two diagonally disposed springs 16 are connected between each runner 3 and the frame, each spring being connected to the runner as at 17 and being connected to the frame by being threaded through any one of a group of three holes 18—18—18 formed in the side frame member 4, the holes 18 of each group being longitudinally spaced in order to provide for the adjustable tensioning of the springs. The springs serve to constantly urge the side runners forwardly relative to the sled frame and the movement of each runner is limited by the engagement of a pin 19 at the upturned forward end of the runner with the front end of a slot 20 formed in the associated side frame member 4. The front end of the slot is preferably so located that when the pin is held in engagement therewith by the action of the springs 16 the struts 13 will be in vertical position.

When weight is applied above either of the side runners the frame will tend to move toward the runner, or vice versa the runner relatively bodily toward the frame, thus producing, when the sled is in motion, a rearwardly swinging movement of the struts 13 about their pivots 14 and a resulting relative depressing of the side runner, or in other words vertical collapsing movement between the side runner and the frame. The position of the right hand side runner after weight has been concentrated above said runner is shown in Figure 4 and also in dotted lines in Figure 2. The collapsing movement of the runner just described is limited by the engagement of the pin 19 with the rear end of the slot 20.

In use, when it is desired that the sled be steered in either direction, for instance to the right, the user shifts his weight toward the right which produces a relative collapsing movement between the runner and the frame in the manner described above. This serves to tilt the sled body as shown in Figure 4 to cause the sled to turn to the right. When the desired turn has been completed the user shifts his weight back over the central runner, after which the sled will proceed in a straight line. Through the provision of the spaced holes 18, by means of which the springs 16 may be adjustably tensioned, the steering characteristics of the sled may be altered as desired to adapt the sled for use by persons of different weights.

I have found that the best results may be obtained if the forward portion of the centrally fixed runner projects somewhat below the plane containing the two side runners. Accordingly, I prefer to so connect the central runner to the frame that its rear end will lie in the same plane as that in which the side runners lie, but so that its forward end will project slightly below the plane of the side runners as shown in Figure 2.

From the foregoing it will be apparent that I have provided a sled which may be very easily steered, and since no lateral flexing of the runners takes place the latter may be of stiff, rugged construction. The sled may be easily steered through the simple expedient of slightly shifting the user's weight from one side to the other and when a turn is made will be tilted in such a way as to produce a desirable banked effect, thus minimizing the danger of skidding or overturning when a sharp turn is made.

I claim:

1. In a sled, the combination of a frame; two runners extending along and under the side edges thereof; and separate yieldable means connecting the respective runners to the frame and normally maintaining the runners in predetermined spaced relation with respect to the frame, the connections of each runner being yieldable independently of movement of the other runner upon the concentration of weight above said first-named runner to permit relative collapsing movement of the frame and runner to thus effect steering of the sled.

2. In a sled, the combination of a frame; two spaced independently movable runners extending under the frame; and separate and independently operable yieldable connecting means between each runner and the frame, the connecting means for each runner including a substantially vertical rigid strut pivoted at its opposite ends to the frame and to the runner respectively, resilient means anchored in the frame and constantly urging the associated runner in one direction into ground engaging position, and a stop for limiting movement of the runner in said direction, said resilient means being yieldable upon the application of weight above said runner to permit movement of the runner in the other direction and collapsing of the runner relative to the frame.

3. In a sled, the combination of a frame; a centrally disposed runner rigidly connected to the frame; two side runners respectively disposed on opposite sides of the centrally disposed runner; and yieldable connections between each side runner and the frame including a plurality of struts pivoted at their opposite ends to the frame and runners respectively, and resilient means constantly urging the runners forwardly relative to the frame but being yieldable upon concentration of weight above either runner to permit movement of said runner simultaneously rearwardly of and relatively vertically toward said frame.

4. In a sled, the combination of a frame; a centrally disposed runner rigidly connected to the frame; and two vertically depressible runners respectively connected to the frame on opposite sides of the centrally disposed runner, the depressible runners lying in the same horizontal plane throughout their lengths, the rear end of the central runner being disposed in said horizontal plane and the front end of said central runner extending below the plane of the depressible runners.

5. In a sled, the combination of a frame; a centrally disposed runner rigidly connected thereto; two side runners respectively disposed on opposite sides of the central runner; a plurality of struts pivotally connected between each side runner and the frame; spring means interposed between the runners and the frame for urging the runners in one direction longitudinally of the frame; and stop means for so limiting the movement of the runner in said direction as to normally maintain the runner in position with the associated struts disposed vertically, and for also limiting movement of the runner in the opposite direction.

6. In a sled, the combination of a frame; a centrally disposed runner rigidly connected thereto; two side runners respectively disposed on opposite sides of the central runner; a plurality of struts pivotally connected between each side runner and the frame; adjustably tensioned spring means interposed between the runners and the frame for urging the runner in one direction longitudinally of the frame; and stop means for so limiting the movement of the runner in said direction as to normally maintain the runner in position with the associated struts disposed vertically, and for also limiting movement of the runner in the opposite direction.

In testimony whereof, I have hereunto subscribed my name.

CHARLES Z. MILLER.